(12) United States Patent
Maeda et al.

(10) Patent No.: US 11,755,519 B2
(45) Date of Patent: Sep. 12, 2023

(54) PERIPHERAL DEVICE, INFORMATION PROCESSING SYSTEM, AND DISPLAY CONTROL METHOD

(71) Applicant: PFU LIMITED, Ishikawa (JP)

(72) Inventors: Yasutaka Maeda, Ishikawa (JP); Osamu Miyakawa, Ishikawa (JP); Hitoshi Matsuo, Ishikawa (JP); Nobuyuki Shichino, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 17/326,875

(22) Filed: May 21, 2021

(65) Prior Publication Data

US 2021/0406211 A1 Dec. 30, 2021

(30) Foreign Application Priority Data

Jun. 24, 2020 (JP) .................................. 2020-108324
Jan. 18, 2021 (JP) .................................. 2021-006082

(51) Int. Cl.
  *G06F 13/38* (2006.01)
  *G06F 11/30* (2006.01)
  *G06F 13/40* (2006.01)

(52) U.S. Cl.
  CPC ........ *G06F 13/385* (2013.01); *G06F 11/3051* (2013.01); *G06F 13/4022* (2013.01); *G06F 2213/0052* (2013.01)

(58) Field of Classification Search
  None
  See application file for complete search history.

(56) References Cited

U.S. PATENT DOCUMENTS

| | | | |
|---|---|---|---|
| 2007/0288704 A1 | 12/2007 | Mizuno | |
| 2008/0043110 A1 | 2/2008 | Aizawa | |
| 2010/0208297 A1 | 8/2010 | Takamiya | |
| 2015/0002872 A1* | 1/2015 | Naruse | H04N 1/00217 358/1.13 |
| 2018/0103160 A1* | 4/2018 | Sugita | H04N 1/00925 |
| 2018/0115660 A1* | 4/2018 | Haba | G06F 3/1229 |

FOREIGN PATENT DOCUMENTS

| | | |
|---|---|---|
| JP | 2006-067231 A | 3/2006 |
| JP | 2007-329663 A | 12/2007 |
| JP | 2010-187089 A | 8/2010 |
| JP | 2013-153536 A | 8/2013 |

* cited by examiner

*Primary Examiner* — Farley Abad
*Assistant Examiner* — Dayton Lewis-Taylor
(74) *Attorney, Agent, or Firm* — McDermott Will & Emery LLP

(57) ABSTRACT

A display control method for a peripheral device shared by a plurality of user terminals includes: storing a connection history of a user terminal for connecting the peripheral device; storing settings information specifying an operation of the peripheral device, the settings information being associated with identification information of the user terminal; selecting settings information stored in the storing settings information or identification information of a user terminal on the basis of the connection history stored in the storing a connection history; and displaying settings information or identification information selected in the selecting.

7 Claims, 22 Drawing Sheets

TERMINAL-SIDE CONNECTION PROCESSING (S10)

SCANNER DEVICE 2

USER TERMINAL 4

FIG. 6A

| SETTINGS TABLE | | | |
|---|---|---|---|
| USER A | PROFILE A1 | PROFILE A2 | PROFILE A3 |
| USER B | PROFILE B1 | PROFILE B2 | NONE |
| ... | ... | ... | ... |

FIG. 6B

| PROFILE |
|---|
| USER ID |
| PROFILE NAME |
| FILE FORMAT |
| COLOR MODE |
| READ SURFACE |
| IMAGE QUALITY(DPI) |
| ... |

FIG. 6C

| CONNECTION HISTORY TABLE | |
|---|---|
| USER A | 2020/06/12 15:32 |
| USER B | 2020/06/12 10:25 |
| ... | ... |

TERMINAL-SIDE CONNECTION PROCESSING (S10)

SCANNER-SIDE ACTIVATION PROCESSING (S20)

SWITCHING PROCESSING (S30)

PROCESSING WHEN SEARCH NOTIFICATION IS RECEIVED (S40)

DISPLAY SCREEN 9

SWITCH DISPLAY 92

SCANNER-SIDE ACTIVATION PROCESSING (S22)

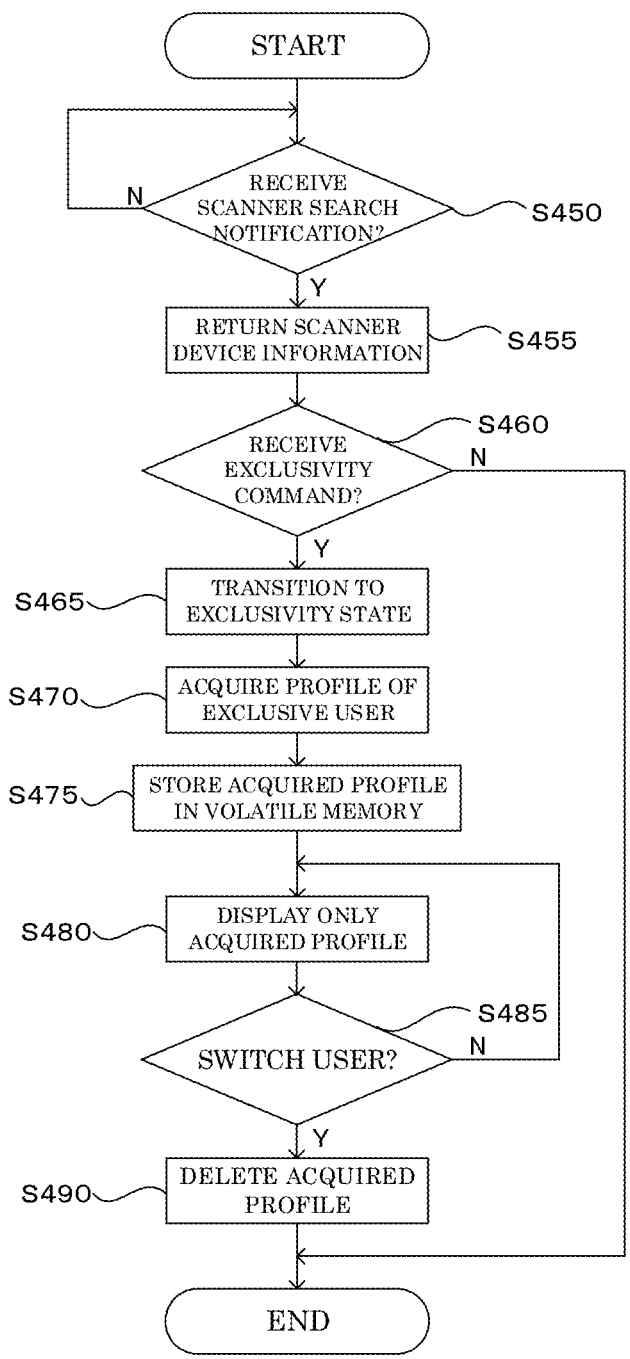

MODE SELECTION SCREEN 93

DISPLAY SCREEN 94 IN "CURRENTLY SELECTED USER" MODE

DISPLAY SCREEN 95 IN "ALL USERS" MODE

DISPLAY SCREEN 96 IN "CURRENTLY CONNECTED USER" MODE

PERIPHERAL DEVICE, INFORMATION PROCESSING SYSTEM, AND DISPLAY CONTROL METHOD

CROSS-REFERENCE TO RELATED APPLICATIONS

This application is based on and claims priority under 35 USC 119 from Japanese Patent Application No. 2020-108324 filed Jun. 24, 2020.

FIELD

The present invention relates to a peripheral device, an information processing system, and a display control method.

BACKGROUND

Patent Document 1 and Patent Document 2 disclose an image processing device including: a display unit configured to display, on a display unit 810, identification information items indicative of a plurality of PCs and configured to selectably display, on a display unit 820, scan setting identifying information from the displayed plurality of identification information items; a request unit configured to request an execution of scanning according to the selected scan setting identifying information; a reception unit configured to receive a scan instruction including a scan setting identified by the scan setting identifying information selected in response to the request; a reading control unit configured to cause image reading processing to be executed according to the scan setting in response to the reception; and a transmission unit configured to transmit image data of a read document to a personal computer (PC).

Also, Patent Document 3 discloses a data processing device in which, in a case of displaying information for selecting save destinations to save input data, the save destinations can be set with a priority, and the information items indicative of the save destinations can be displayed on the basis of the determined priority.

Furthermore, Patent Document 4 discloses an image input device being applied to a digital camera 100 and including a wireless communication function for wirelessly connecting to a PC 101, i.e., an information processing device. When the image input device is connected to the PC 101 via a USB cable, is preset with pairing information for identifying the PC 101, i.e., a communication partner, and receives an instruction to start connection with the PC 101, the image input device transitions to a state in which wireless connection with the PC 101 is enabled on the basis of the set pairing information.

Patent Document 1: Japanese Unexamined Patent Application Publication No. 2013-153536
Patent Document 2: Japanese Unexamined Patent Application Publication No. 2010-187089
Patent Document 3: Japanese Unexamined Patent Application Publication No. 2007-329663
Patent Document 4: Japanese Unexamined Patent Application Publication No. 2006-067231

SUMMARY OF THE INVENTION

There is provided a peripheral device including a user interface with excellent browsability and operability.

A peripheral device shared by a plurality of user terminals, comprising a memory; a non-volatile memory; and a processor coupled to the memory and the non-volatile memory, the processor configured to store a connection history of a user terminal to the peripheral device, into the non-volatile memory; store settings information specifying an operation of the peripheral device, in association with identification information of the user terminal, into the non-volatile memory; and select the settings information or the identification information of the user terminal stored in the non-volatile memory, based on the connection history stored in the non-volatile memory.

The peripheral device preferably further comprising a display device; and the processor is further configured to display the selected settings information or the identification information of the user terminal, on the display device, and not display information relating to another user terminal.

Preferably, when the peripheral device is activated, select settings information or identification information of a user terminal that connected last to the peripheral device, based on the connection history stored in the non-volatile memory; and when the peripheral device is activated, display the settings information or the identification information of the user terminal that connected last on the display device.

The peripheral device preferably further includes the processor is further configured to determine whether or not to connect to a user terminal; and select settings information or identification information of a user terminal, based on the connection history stored in the non-volatile memory and a result of the determination.

The peripheral device preferably further includes the processor is further configured to detect a switch operation of a user terminal using the peripheral device; and in a case where a switch operation is detected, display identification information of the plurality of user terminals as selections on the display device and display settings information of a selected user terminal on the display device.

Preferably, in a case where a switch operation is detected, display identification information of a user terminal stored in the non-volatile memory as a switch selection.

Preferably, display a switch selection arranged in order of the connection history.

Also, a peripheral device shared by a plurality of user terminals, comprising a volatile memory; a non-volatile memory; and a processor coupled to the volatile memory and the non-volatile memory, the processor configured to set an exclusivity state in which a user exclusively uses the peripheral device; acquire settings information relating to the peripheral device for the user; and display the settings information acquired.

The peripheral device preferably further includes the processor is further configured to in a case where an exclusivity state of the peripheral device is cancelled, delete the settings information acquired.

Preferably, acquire settings information of a new user when an exclusivity state is switched to another user; and delete settings information of a previous user when an exclusivity state is switched to another user.

The peripheral device preferably further includes the processor is further configured to switch between a first operation mode in which settings information of a user is recorded only in the volatile memory and a second operation mode in which settings information of a user is recorded in the non-volatile memory; and display the acquired settings information, in a case where the first operation mode is set.

Preferably, in a case where the first operation mode is set, each time the peripheral device is connected to a plurality of user terminals, acquires settings information and records the settings information into the volatile memory, and displays the settings information recorded in the volatile memory; and in a case where the second operation mode is set, displays settings information recorded in the non-volatile memory.

Also, a display control method for a peripheral device shared by a plurality of user terminals, comprising the steps of storing a connection history of a user terminal for connecting the peripheral device; storing settings information specifying an operation of the peripheral device, the settings information being associated with identification information of the user terminal; selecting settings information stored in the non-volatile memory or identification information of the user terminal, based on the connection history stored in the non-volatile memory; and displaying settings information or identification information selected.

BRIEF DESCRIPTION OF THE DRAWINGS

There is provided a peripheral device including a user interface with excellent browsability and operability.

FIG. 6A is a table showing an example of information registered in a setting DB 370 of the scanner device 2, FIG. 6B is a table showing an example of a profile, and FIG. 6C is a table showing an example of information registered in a connection history DB 372.

FIG. 17 is a flowchart for describing connection processing (S45) when a "currently connected user" mode is active.

DESCRIPTION OF EMBODIMENTS

Figure 1:
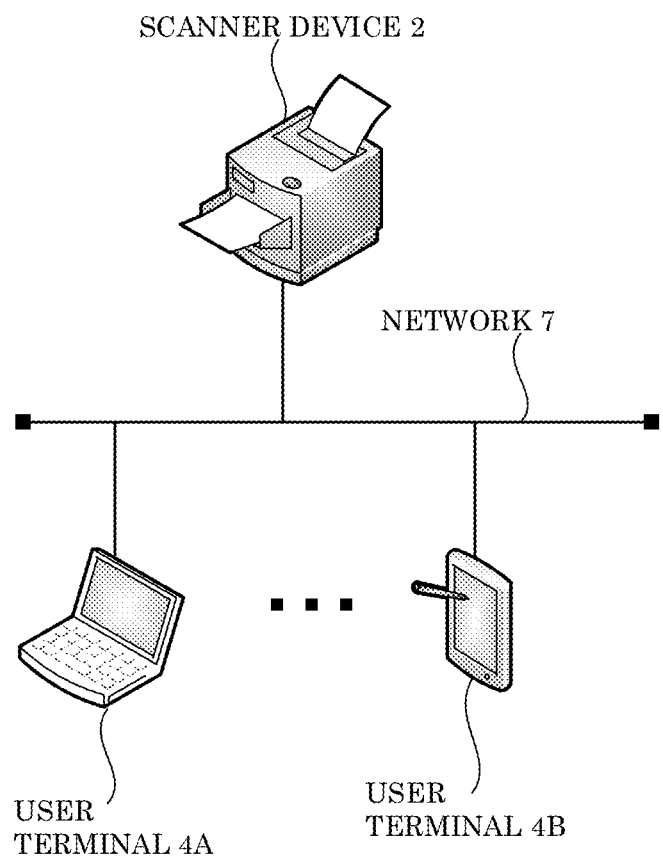
FIG. 1 is a diagram illustrating an example of a whole configuration of a scanner sharing system 1.

FIG. 1 is a diagram illustrating an example of a whole configuration of a scanner sharing system 1.

As illustrated in FIG. 1, the scanner sharing system 1 includes a scanner device 2 and a plurality of user terminals 4. These are connected via a network 7.

The scanner device 2 is an example of a peripheral device shared by the plurality of user terminals 4 and is an image reading device that reads an image from a document. The peripheral device is not limited to the scanner device 2 and may be, for example, a display, a projector, or a speaker shared over the network 7. In this example, the scanner device 2 is a network scanner installed with an operation screen such as a touch screen.

Each of the user terminals 4 is a computer terminal used by a user and, for example, may communicate with the scanner device 2 to control the scanner device 2 according to a user operation. The network 7 is a local area network (LAN), for example.

In the configuration described above, the scanner device 2 creates and manages scanning settings (including a save destination, a saving format, and a resolution) via driver software installed in the user terminal 4. The scanning settings information created by the user terminal 4 is referred to as a profile and is synchronized with the scanner device 2 to display the same profile on the operation screen of the scanner device 2.

Typically, a plurality of profiles are made for one user due to profiles being different depending on a medium (such as a document, a business card, and a receipt) to be scanned. The user selects a profile matching a desired scanning document and save destination through the driver software or an operation screen of the scanner device 2 and depresses a scan button to cause the scanner device 2 to start scanning. The document is scanned according to a read surface and a resolution in the profile and then transmitted to the user terminal 4. In the user terminal 4, the driver software performs image processing, title extraction processing, and the like according to the profile setting, and the result is saved.

In a case where the scanner device 2 is shared by a plurality of user terminals, all of the profiles of all of the users are displayed on the operation screen of the scanner device 2, which may cause the operation screen to be cluttered. Also, when scanning, a profile created by the user is selected from the operation screen. However, if a profile of a wrong user may be selected, the scanning result may be saved on a wrong user terminal 4, or scanning may be prevented from starting due to the power of the user terminal 4 of the wrong user being OFF, and other such problems may arise.

One approach to solve this problem includes preventing a profile of another user from being displayed by having a specific user terminal 4 and the scanner device 2 connect in a one-to-one relationship (exclusivity).

However, this approach has another problem. In a case where the scanner device 2 is shared, a procedure of disconnecting between the user terminal 4 currently connected and the scanner device 2 or a procedure of switching connection to another user terminal 4 is made complicated, and thus, sharing the scanner device 2 with a plurality of users is made difficult.

In light of this, to solve such problems, the inventors have looked into methods enabling simple switching and automatic connecting of users using the operation screen of the scanner device 2.

Note that in a case of a multifunction printer, due to its functional characteristics, the multifunction printer is connected to multiple user terminals for copying and scanning. Thus, the multifunction printer is not provided with a function of exclusively connecting to a specific user terminal when activated. In the scanner device 2 shared by a plurality of users, in a scene in which the scanner device 2 is used continuously by a specific user, such as a scene in which the specific user borrows the scanner device 2 for a while, the scanner device 2 according to the present embodiment is provided with a function of exclusively connecting to a specific user terminal when the scanner is activated to allow for easier use of the scanner device 2.

Figure 2:
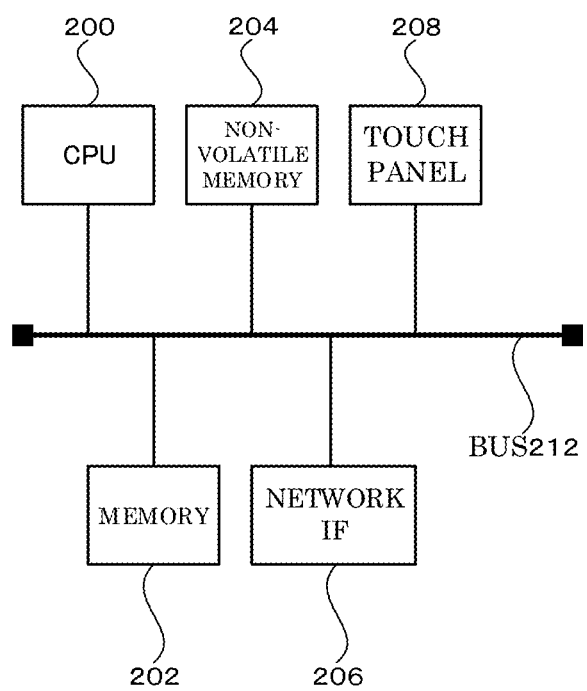
FIG. 2 is a diagram mainly illustrating an example of a hardware configuration of a control portion of a scanner device 2.

FIG. 2 is a diagram mainly illustrating an example of a hardware configuration of a control portion of the scanner device 2.

As illustrated in FIG. 2, the scanner device 2 includes a CPU 200, a volatile memory 202, a non-volatile memory 204, a network interface 206 (network IF 206), and a touch panel 208. These components are connected to one another via a bus 212.

The CPU 200 is a central processing unit, for example.

The memory 202 is a volatile memory, for example, and functions as a main storage device.

The non-volatile memory 204 functions as a non-volatile recording device, for example, and stores computer programs (for example, a scanner program 3 of FIG. 4) and other data files.

The network IF 206 is an interface for communicating via a wired or wireless connection.

The touch panel 208 is an example of an operation screen and is a liquid crystal touch panel, for example.

Figure 3:
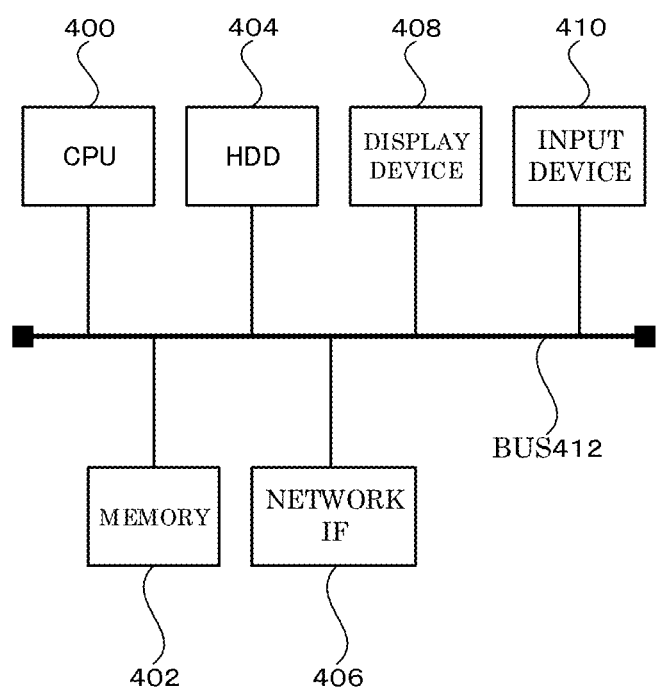
FIG. 3 is a diagram illustrating an example of a hardware configuration of a user terminal 4.

FIG. 3 is a diagram illustrating an example of a hardware configuration of the user terminal 4.

As illustrated in FIG. 3, the user terminal 4 includes a CPU 400, a memory 402, a HDD 404, a network interface 406 (network IF 406), a display device 408, and an input device 410. These components are connected to one another via a bus 412.

The CPU 400 is a central processing unit, for example.

The memory 402 is a volatile memory, for example, and functions as a main storage device.

The HDD 404 is a hard disk drive device, for example, and functions as a non-volatile recording device, for example, and stores computer programs (for example, a driver program 5 of FIG. 5) and other data files.

The network IF 406 is an interface for communicating via a wired or wireless connection.

The display device 408 is a liquid crystal display, for example.

The input device 410 is a keyboard and a mouse, for example.

Figure 4:
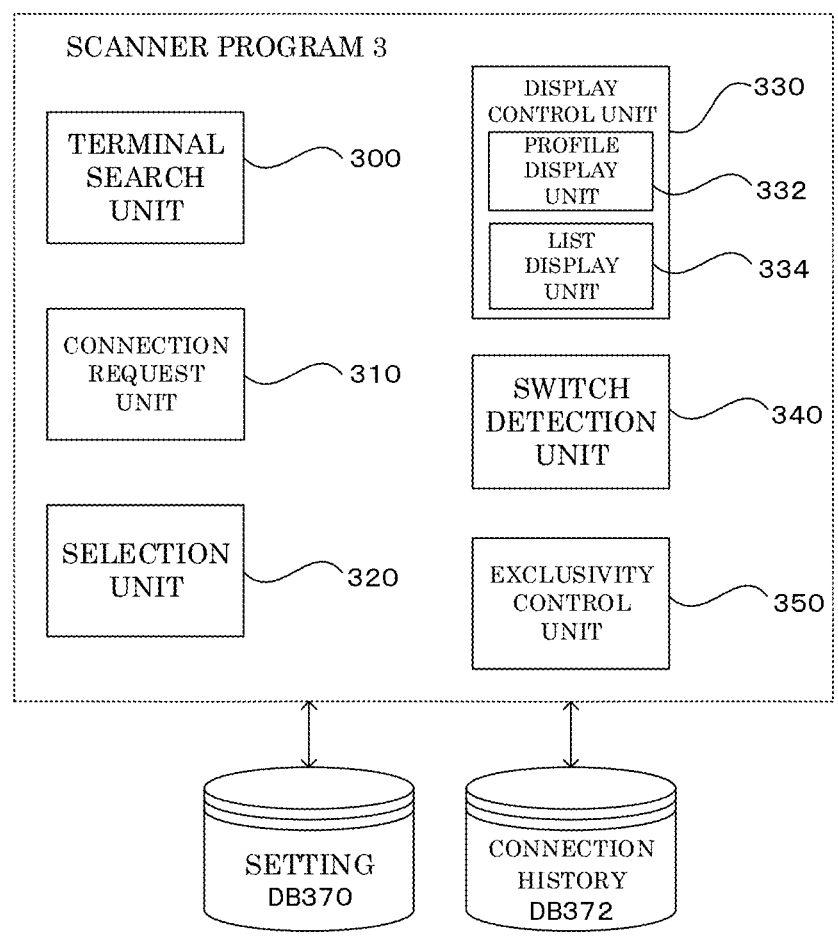
FIG. 4 is a diagram mainly illustrating an example of an exclusivity control portion and a display control portion of a functional configuration of the scanner device 2.

FIG. 4 is a diagram mainly illustrating an example of an exclusivity control portion and a display control portion of a functional configuration of the scanner device 2.

As illustrated in FIG. 4, the scanner device 2 is installed with the scanner program 3 and is constituted by a setting database 370 (setting DB 370) and a connection history database 372 (connection history DB 372). The scanner program 3 is stored on a recording medium such as a CD-ROM, for example, and installed in the scanner device 2 via the recording medium.

The scanner program 3 includes a terminal search unit 300, a connection request unit 310, a selection unit 320, a display control unit 330, a switch detection unit 340, and an exclusivity control unit 350. The display control unit 330 includes a profile display unit 332 and a list display unit 334.

Note that a portion or all of the scanner program 3 may be realized by hardware such as ASIC, or be realized by borrowing a portion of a function of an operating system (OS).

In the scanner program 3, the terminal search unit 300 searches for the user terminals 4 connected to the network 7. For example, when the scanner device 2 is powered ON, the terminal search unit 300 broadcasts to the network 7 a power ON notification indicating the power has been turned ON and identifies the user terminals connected to the network 7 on the basis of the replies. The terminal search unit 300 is an example of a connection determination unit according to the present invention.

The connection request unit 310 selects the user terminal 4 for connection from the user terminals 4 found by the terminal search unit 300 and sends a connection request to the selected user terminal 4. The connection request unit 310 in the present example transmits, to the user terminals 4 found by the terminal search unit 300, scanner device information including identification information of the user terminal that connected last.

The selection unit 320 selects the settings information stored in the setting DB 370 or the identification information of the user terminal on the basis of the connection history stored in the connection history DB 372. More specifically, the selection unit 320 selects the settings information or the identification information of the user terminal on the basis of the connection history stored in the connection history DB 372 and the search result obtained by the terminal search unit 300. For example, when the scanner device 2 is activated, the selection unit 320 selects, as information to display, the settings information or the identification information of the user terminal connected last to the scanner device 2 from the user terminals 4 found by the terminal search unit 300 on the basis of the connection history stored in the connection history DB 372.

The display control unit 330 displays, on the touch panel 208, the settings information or the identification information of the user terminal selected by the selection unit 320 and does not display the information relating to other user terminals. Not being displayed means a state of not being displayed unless there is an active operation by a user. In the present example, the profile display unit 332 displays, on the touch panel 208, the profile (settings information) of the user terminal 4 selected by the selection unit 320 and does not display, on the touch panel 208, the profile of other user terminals 4.

Also, in a case where a switch operation is detected by the switch detection unit 340, the display control unit 330 displays, on the touch panel 208, the identification information of the plurality of user terminals as selections and displays, on the touch panel 208, the settings information of the selected user terminal. In the present example, in a case where a switch operation is detected by the switch detection unit 340, the list display unit 334 references the connection history DB 372 and displays, on the touch panel 208, a list of the identification information of the user terminals 4 that have connected to the scanner device 2.

The switch detection unit 340 detects a switch operation of the user terminal 4 using the scanner device 2. The switch detection unit 340 in the present example detects a switch operation of the user terminal 4 on the basis of a touch operation by the user on the touch panel 208.

The exclusivity control unit 350 controls an exclusivity state of the scanner device 2 according to an exclusivity command received from the user terminal 4. When the exclusivity control unit 350 in the present example receives an exclusivity command from the user terminal 4, the exclusivity control unit 350 sets a state in which the user terminal 4 exclusively uses the scanner device 2, and when a switch operation of the user terminal 4 is detected by the switch detection unit 340, the exclusivity state is cancelled.

Figure 5:
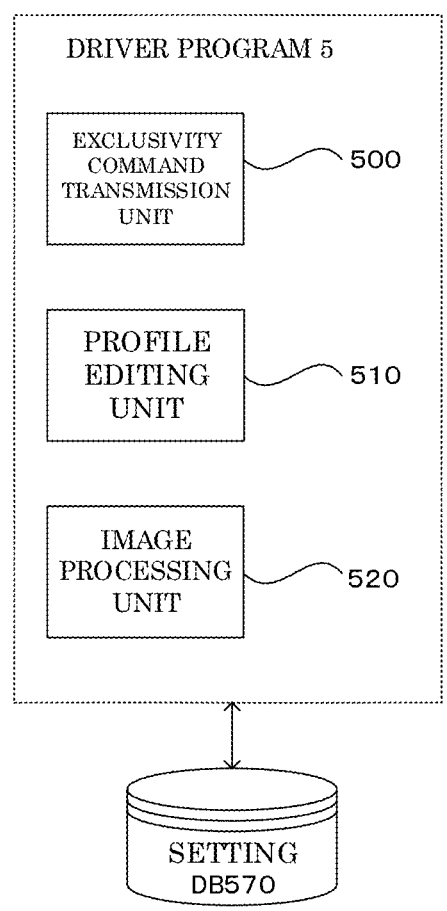
FIG. 5 is a diagram illustrating an example of a functional configuration of the user terminal 4.

FIG. 5 is a diagram illustrating an example of a functional configuration of the user terminal 4.

As illustrated in FIG. 5, the user terminal 4 is installed with the driver program 5 and is constituted by a setting database 570 (setting DB 570). For example, the driver program 5 is stored on a recording medium such as a CD-ROM, and installed in the user terminal 4 via the recording medium.

The driver program 5 includes an exclusivity command transmission unit 500, a profile editing unit 510, and an image processing unit 520.

Note that a portion or all of the driver program 5 may be realized by hardware such as ASIC, or realized by borrowing a portion of a function of an operating system (OS).

In the driver program 5, the exclusivity command transmission unit 500 transmits an exclusivity command for exclusively using the scanner device 2 to the scanner device 2. In a case where "identification information of a user terminal that connected last" included in the scanner device information received from the scanner device 2 is of the user terminal including the exclusivity command transmission unit 500, the exclusivity command transmission unit 500 in the present example transmits an exclusivity command to the scanner device 2.

The profile editing unit 510 edits a set of settings information defining an operation of the scanner device 2 as a profile in response to a user operation. The profile edited by the profile editing unit 510 is stored in the setting DB 570. Furthermore, the profile stored in the setting DB 570 is stored also in the setting DB 370 of the scanner device 2.

The image processing unit 520 executes processing, such as image processing, title extraction processing, folder automatic registration processing, and the like on the image data received from the scanner device 2 according to the profile selected by the user.

FIG. 6A is a table showing an example of information registered in the setting DB 370 of the scanner device 2, FIG. 6B is a table showing an example of a profile, and FIG. 6C is a table showing an example of information registered in the connection history DB 372.

As shown in FIG. 6A, the setting DB 370 of the scanner device 2 stores profiles set by a user in association with a user terminal. A plurality of profiles per one user are registered in the setting DB 370 in the present example.

As shown in FIG. 6B, the registered profiles each include a user ID for identifying a user, information specifying a file format (PDF or JPG) of scanned image data in association with profile names for identifying a profile, information specifying a color mode (automatic determination/color/gray/black and white) during scanning, information specifying a read surface (one side/both sides) during scanning, and information specifying a scan image quality (DPI). Note that the information specifying a file format is registered only in the setting DB 570 on a user terminal 4 side, and not registered in the setting DB 370 on a scanner device 2 side.

As shown in FIG. 6C, the connection history DB 372 stores the connection history information of the user terminals 4 that have connected to the scanner device 2. The connection history information includes a user ID for identifying the user terminals 4 and information indicating a date and time of connection to the scanner device 2. The connection date and time registered in the connection history DB 372 in the present example is updated to the latest connection date and time each time a user terminal connects to the scanner device 2.

Figure 7:
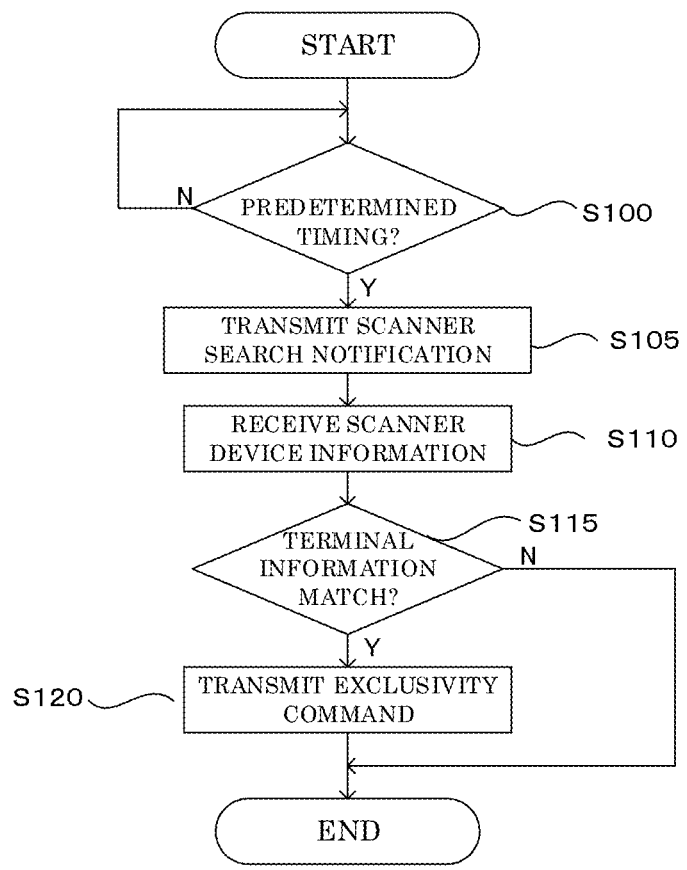
FIG. 7 is a flowchart for describing terminal-side connection processing (S10) by the user terminal 4.

FIG. 7 is a flowchart for describing terminal-side connection processing (S10) by the user terminal 4.

As illustrated in FIG. 7, in step 100 (S100), the driver program 5 of the user terminal 4 determines whether or not a predetermined timing has arrived. If the predetermined timing has arrived, the process proceeds to processing of step 105 (Yes in step 100), and if the predetermined timing has not arrived, the process goes into standby (No in step 100). The predetermined timing refers to, for example, a time when the driver program 5 is activated, a time when a power ON notification or a state change notification is received from the scanner device 2, or a time when a predetermined amount of time (one minute) has elapsed in a state of not being connected to the scanner device 2.

In step 105 (S105), the exclusivity command transmission unit 500 of the user terminal 4 transmits a scanner search notification for searching for the scanner device 2.

In step 110 (S110), the exclusivity command transmission unit 500 receives scanner device information from the scanner device 2 as a reply to the scanner search notification.

In step 115 (S115), the exclusivity command transmission unit 500 determines whether or not the identification information of the user terminal included in the received scanner device information is the identification information of the user terminal including the exclusivity command transmission unit 500. If the identification information is of the user terminal including the exclusivity command transmission unit 500, the process proceeds to processing of step 120, and if the identification information is not of the user terminal including the exclusivity command transmission unit 500, the terminal-side connection processing (step 10) ends.

In step 120 (S120), the exclusivity command transmission unit 500 transmits an exclusivity command to the scanner device 2.

This puts the scanner device 2 in a state of being used exclusively by the user terminal 4.

Figure 8:
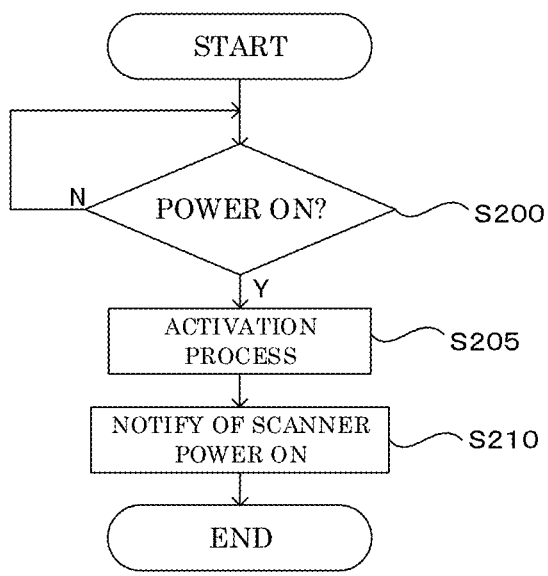
FIG. 8 is a flowchart for describing scanner-side activation processing (S20) by the scanner device 2.

FIG. 8 is a flowchart for describing scanner-side activation processing (S20) by the scanner device 2.

As illustrated in FIG. 8, in step 200 (S200), when the scanner device 2 detects a power ON operation, the process proceeds to processing of step 205 (Yes in step 200), and when the scanner device 2 does not detect a power ON operation, the process goes into standby until a power ON operation is performed (No in step 200).

In step 205 (S205), the scanner device 2 executes activation processing.

In step 210 (S210), the terminal search unit 300 of the scanner device 2 broadcast to the network 7 a power ON notification when the activation processing is completed.

This makes the user terminal 4 aware that scanner search of the scanner device 2 can be performed.

Figure 9:
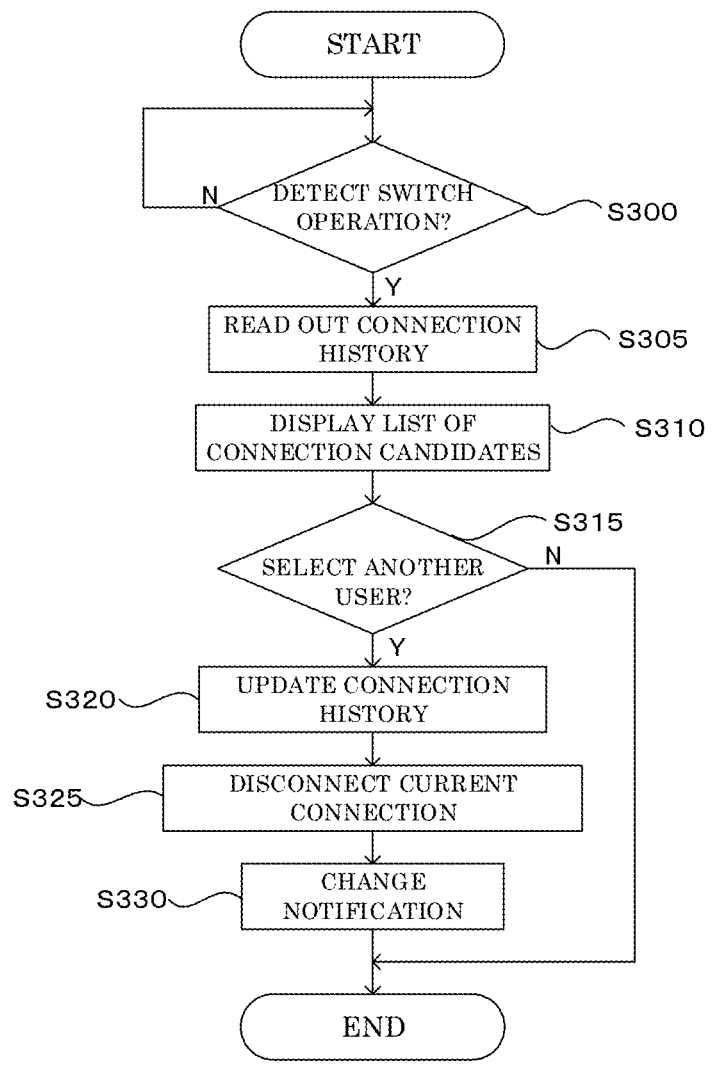
FIG. 9 is a flowchart for describing user switching processing (S30) by the scanner device 2.

FIG. 9 is a flowchart for describing user switching processing (S30) by the scanner device 2.

Figure 11A:
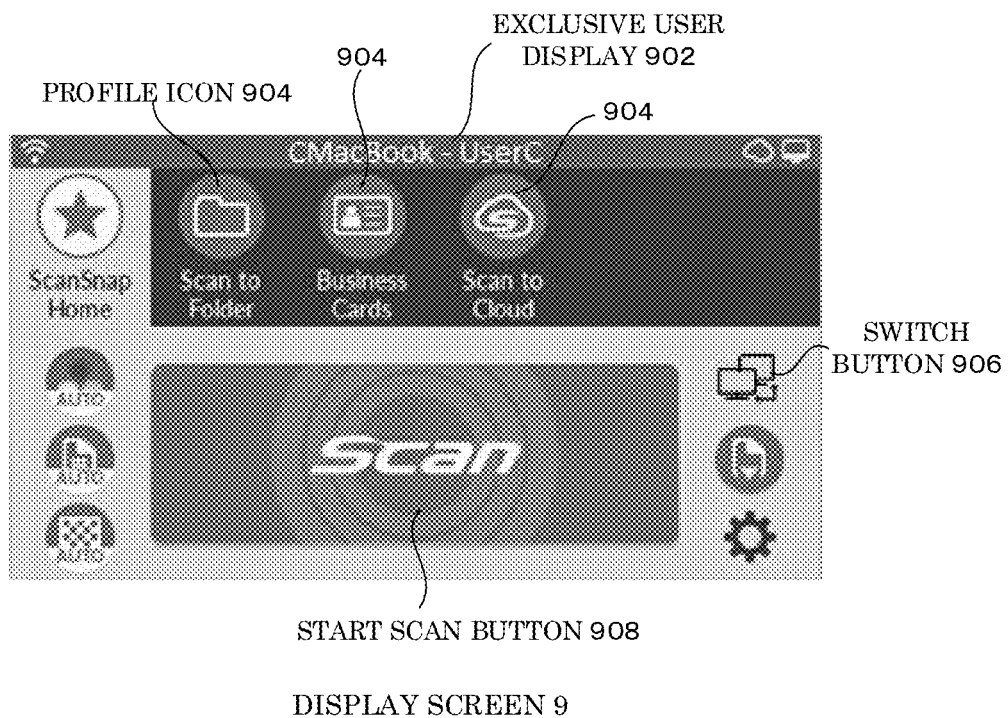
FIGS. 11A and 11B are diagrams illustrating an example of a display screen of a touch panel 208.

As illustrated in FIG. 9, in step 300 (S300), the switch detection unit 340 of the scanner device 2 goes into standby until a user detects a switch operation (No in step 300) and the process proceeds to processing of step 305 when a user detects a switch operation. Specifically, as illustrated in FIG. 11A, a display screen 9 provided with a switch button 906 for switching a user is display on the touch panel 208, and the switch detection unit 340 detects a user touch operation on the switch button 906 as a switch operation.

In step 305 (S305), the switch detection unit 340 reads out the connection history information from the connection history DB 372.

In step 310 (S310), the list display unit 334 creates a list of user IDs arranged in order of connection on the basis of the connection history information read out from the connection history DB 372.

Figure 11B:
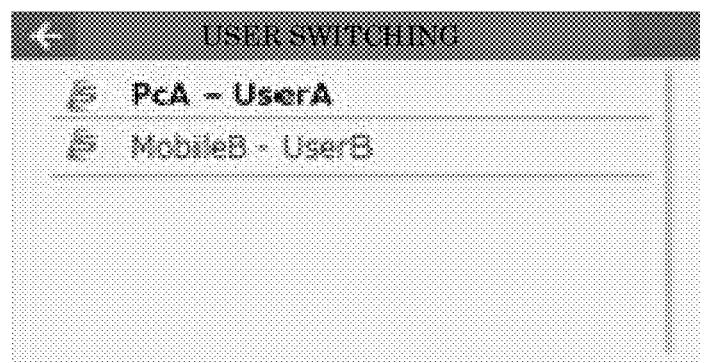

As illustrated in FIG. 11B, a switch display 92 provided with a list of user IDs is displayed on the touch panel 208.

In step 315 (S315), the switch detection unit 340 determines whether the user ID selected by the user is the user ID of the current user or another user. If another user is selected, the process proceeds to processing of step 320, and if the current user is selected, the switching processing (S30) ends.

In step 320 (S320), the switch detection unit 340 updates the identification information of the user terminal that connected last with the user terminal of the user selected by the user.

In step 325 (S325), the switch detection unit 340 disconnects current connection between the scanner device 2 and the user terminal 4.

In step 330 (S330), the switch detection unit 340 broadcasts a state change notification of the scanner device 2 to the network 7.

Accordingly, the user terminal 4 which is the switching destination that received the state change notification acquires the scanner device information, in response to this, transmits an exclusivity command to the scanner device 2, and connects to the scanner device 2.

Figure 10:
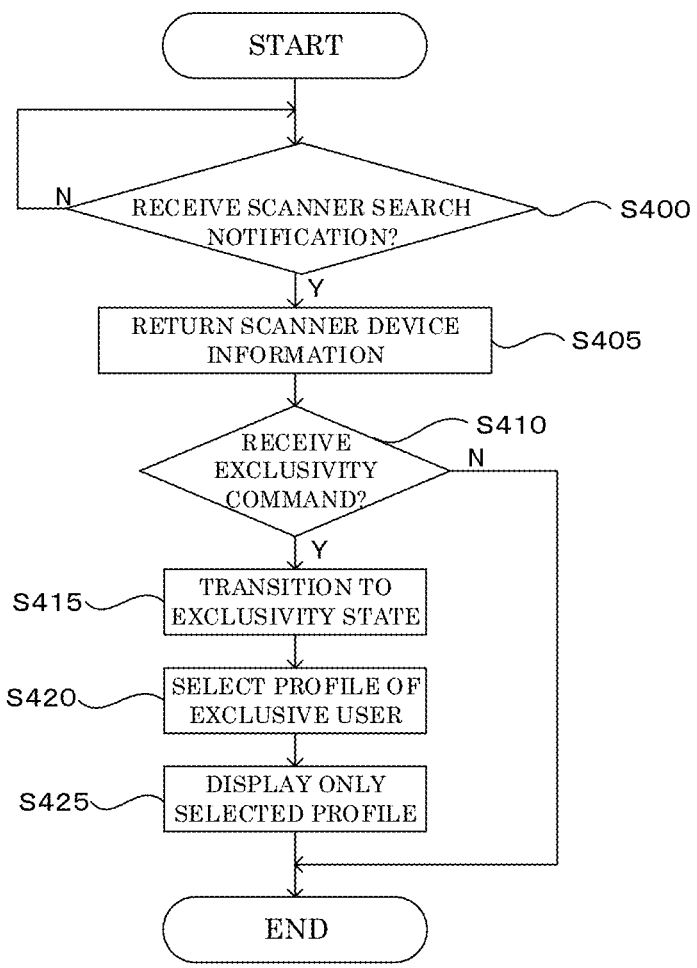
FIG. 10 is a flowchart for describing processing (S40) of the scanner device 2 in a case where a search notification is received.

FIG. 10 is a flowchart for describing the processing (S40) of the scanner device 2 in a case where a search notification is received.

As illustrated in FIG. 10, in step 400 (S400), the connection request unit 310 of the scanner device 2 goes into standby until a scanner search notification is received from the user terminal 4 (No in step 400), and when a scanner search notification is received from the user terminal 4, the process proceeds to processing of step 405 (Yes in step 400).

In step 405 (S405), the connection request unit 310 transmits, to the user terminal 4, scanner device information (including the identification information of the user terminal that connected last) as the reply to the scanner search notification.

In step 410 (S410), if the scanner program 3 receives an exclusivity command from any one of the user terminals 4, the process proceeds to the processing of step 415, and if the scanner program 3 does not receive an exclusivity command from any of the user terminals 4 within a predetermined time period, the processing (S40) ends.

In step 415 (S415), when the exclusivity control unit 350 receives an exclusivity command from any one of the user terminals 4, a state transitions to an exclusivity state by the user terminal 4.

In step 420 (S420), the selection unit 320 reads out the profile of the exclusive user terminal 4 from the setting DB 370.

In step 425 (S425), the profile display unit 332 displays only the profile read out by the selection unit 320 on the touch panel 208 and prohibits display of other user profiles. Specifically, as illustrated in FIG. 11A, the display screen 9 is displayed on the touch panel 208. An exclusive user display 902 displays, in the window title of the display screen 9, the identification information of the exclusive user terminal 4, and profile icons 904 indicating a profile of the exclusive user terminal 4 are disposed in a display region displaying a profile. When a start scan button 908 is touched with any one of the profile icons 904 selected, scanning processing is started according to the selected profile.

Thus, the scanner device 2 exclusively connects to the user terminal that connected last and displays the profile of the user terminal on the touch panel 208.

Figure 12:
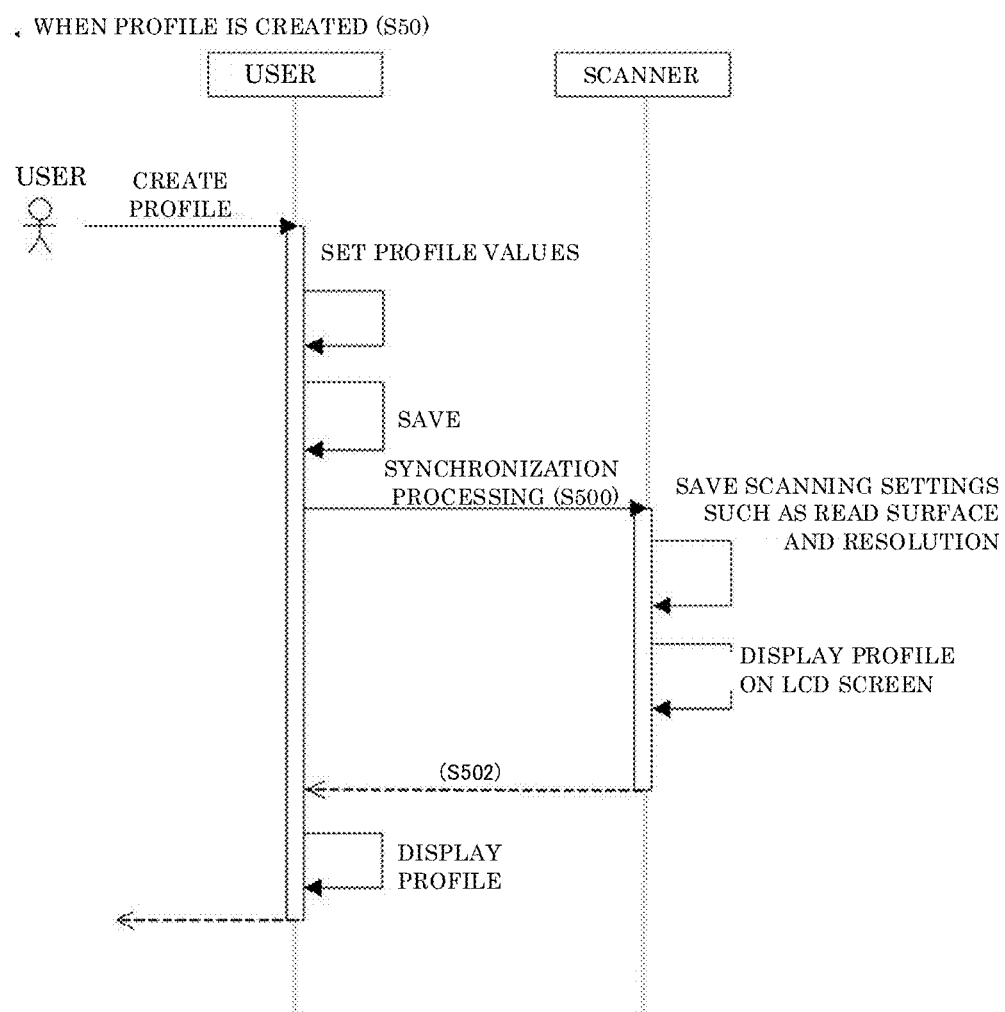
FIG. 12 is a sequence diagram (S50) when a profile is created in the scanner sharing system 1.

FIG. 12 is a sequence diagram (S50) when a profile is created in the scanner sharing system 1.

As illustrated in FIG. 12, when the user activates the driver program 5 at the user terminal 4, sets values for the profile, and saves the values in the setting DB 570, the user terminal 4 transmits, to the scanner device 2, the profile saved in the setting DB 570 and synchronizes the setting DB (S500).

When the scanner device 2 saves the received profile in the setting DB 370 and the profile is displayed on the touch panel 208, the scanner device 2 notifies the user terminal 4 of the completion of profile registration (S502). In response to the registration completion notification, the user terminal 4 displays the registered profile.

Figure 13:
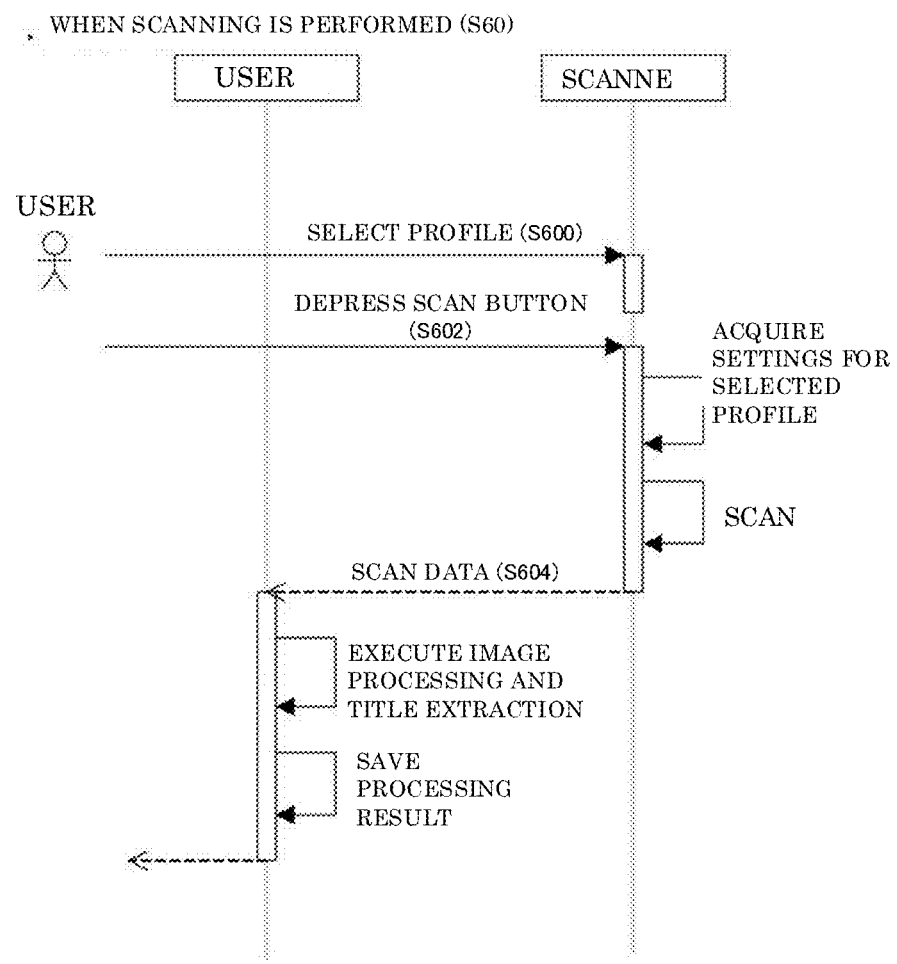
FIG. 13 is a sequence diagram (S60) when scanning is performed in the scanner sharing system 1.

FIG. 13 is a sequence diagram (S60) when scanning is performed in the scanner sharing system 1.

As illustrated in FIG. 13, when the user performs a selection operation to select a desired profile icon of the profile icons 904 (S600) on the display screen 9 (FIG. 11A) displayed on the touch panel 208 of the scanner device 2, the scanner device 2 reads out settings information of the selected profile.

Next, when the user touches the start scan button 908 displayed on the touch panel 208 (S602), the scanner device 2 executes scanning processing according to the read out profile (settings information) and transmits the scan data to the user terminal 4 (S604).

The user terminal 4 executes processing (such as image processing and title extraction processing) corresponding to the selected profile on scan data received from the scanner device 2 and saves the processing result according to the profile.

Figure 14A:
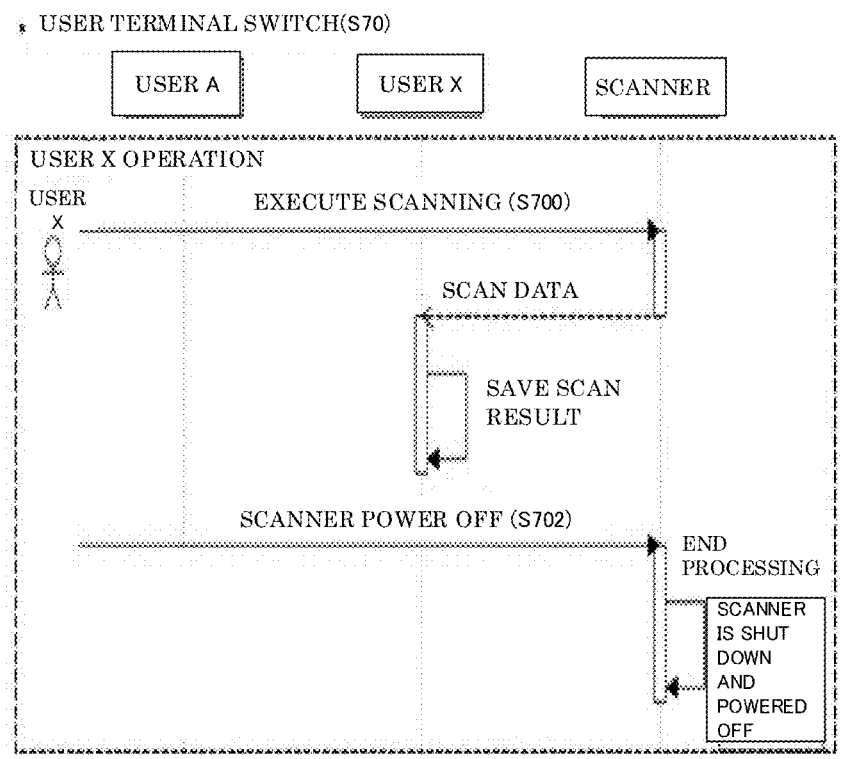
FIGS. 14A and 14B are a sequence diagram (S70) when a user terminal is switched in the scanner sharing system 1.
Figure 14B:
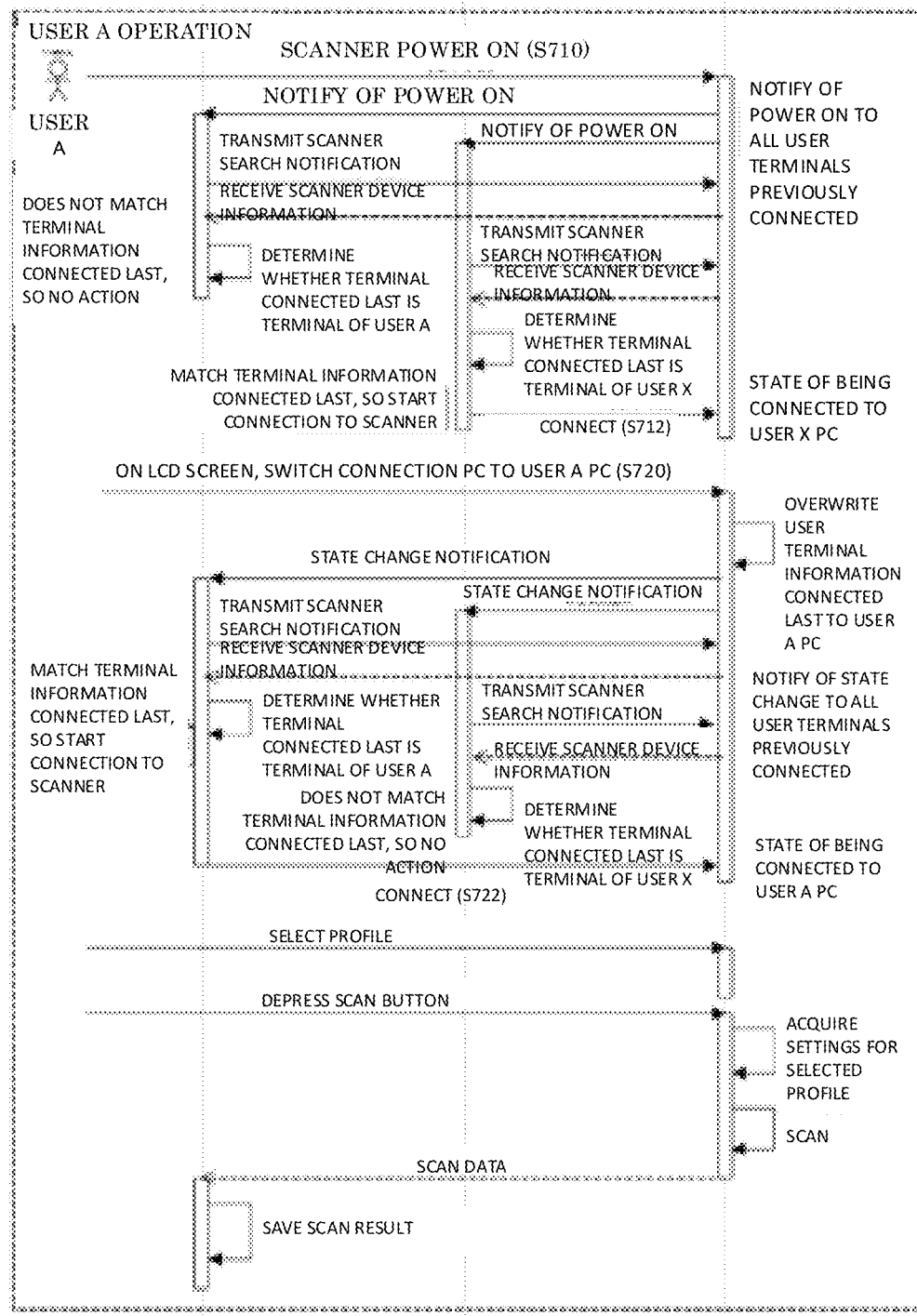

FIGS. 14A and 14B are a sequence diagram (S70) when a user terminal is switched in the scanner sharing system 1.

As illustrated in FIGS. 14 A and 14B, in a time period in which the user terminal 4 of a user X exclusively uses the scanner device 2, when the scanner device 2 detects a touch operation of the start scan button (S700), the scanner device 2 executes scanning processing and transmits scan data to the user terminal 4 of the user X.

When the user X operates the scanner device 2 to turn OFF the power (S702), the scanner device 2 disconnects the connection with the user terminal 4 and shuts down.

Next, when a user A operates the scanner device 2 to turn ON the power (S710), the scanner device 2 executes activation processing, and when the activation processing is complete, transmits a power ON notification to all of the user terminals 4 on the network 7. In response to the power ON notification, each of the user terminals 4 transmits a scanner search notification to the scanner device 2 and receives the scanner device information from the scanner device 2. The scanner device 2 enters, into the scanner device information, "identification information of a user terminal that connected last (user X)".

Each of the user terminals 4 determines whether or not the "identification information of a user terminal that connected last" is the own user terminal on the basis of the scanner device information received from the scanner device 2, and only the user terminal 4 determined to be the own user terminal transmits an exclusivity command to the scanner device 2 and establishes a connection. As a result, the user terminal 4 of the user X that connected last continues to exclusively use the scanner device 2 (S712).

Next, when the user A operates the scanner device 2 to switch to the user A (S720), the scanner device 2 rewrites the identification information of the user A as "identification information of a user terminal that connected last" and transmits a state change notification to all of the user terminals 4 on the network 7.

In response to the state change notification, each of the user terminals 4 transmits a scanner search notification to the scanner device 2 and receives the scanner device information from the scanner device 2.

Each of the user terminals 4 determines whether or not the "identification information of a user terminal that connected last" is the own user terminal on the basis of the scanner device information received from the scanner device 2, and only the user terminal 4 determined to be the own user terminal transmits an exclusivity command to the scanner device 2 and establishes a connection.

Because the identification information of the user A has been rewritten as "identification information of a user terminal that connected last", the user terminal 4 of the user A connects to the scanner device 2 and exclusively uses the scanner device 2 (S722).

As a result, the profile of the user A is displayed on the touch panel 208 of the scanner device 2, and the scan data is transmitted to the user terminal 4 of the user A.

As described above, according to the scanner sharing system 1 of the present embodiment, because the connection destination and displayed profile are selected according to the connection history, time and effort involved in connecting and disconnecting is reduced, and only the necessary profile is displayed in the limited display region of the touch panel 208, simplifying the profile selection operation. In particular, this embodiment is suitably applied to a peripheral device, such as the scanner device 2, that is used continuously by a specific user.

[First Modification]

Next, a modification of the embodiment described above will be described.

In the embodiment described above, an aspect is described in which the profile (settings information) of a specific user is narrowed down to be displayed. However, in a first modification, an aspect will be described in which a plurality of operation modes are prepared, and a range of users whose profiles are displayed is changed depending on the operation modes. Specifically, an aspect will be described in which three modes, a "currently selected user" mode, an "all users" mode, and a "currently connected user" mode, are prepared.

The "currently selected user" mode is an operation mode corresponding to the embodiment described above in which only the profile of a selected specific user is displayed. The profile of another user can be displayed by switching the selected user.

The "all users" mode is an operation mode in which all profiles registered in the scanner device 2 are displayed. All user names and profiles sharing the scanner device 2 can be displayed.

The "currently connected user" mode is an operation mode in which only the profile of a user connected to the scanner device 2 is displayed, and the profile of other users cannot be displayed.

In the first modification, user interfaces having different security levels are provided by switching between the operation modes described above.

Figure 15:
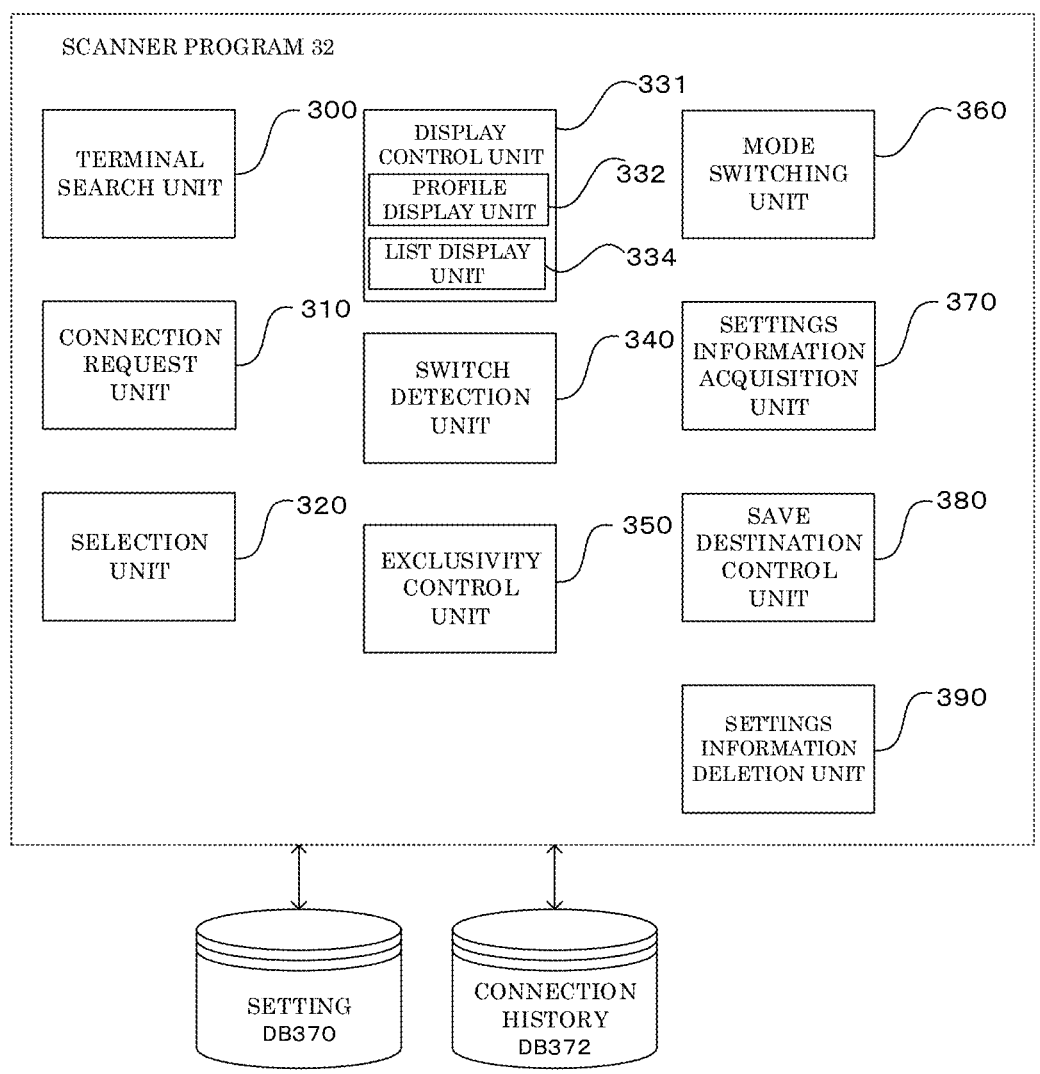
FIG. 15 is a diagram mainly illustrating an example of an exclusivity control portion and a display control portion of a functional configuration of the scanner device 2 according to a first modification.

FIG. 15 is a diagram mainly illustrating an example of an exclusivity control portion and a display control portion of a functional configuration of the scanner device 2 according to the first modification. Note that the components in the diagram that are essentially the same as the components in FIG. 4 are given the same reference sign.

As illustrated in FIG. 15, a scanner program 32 of the first modification includes the terminal search unit 300, the connection request unit 310, the selection unit 320, a display control unit 331, the switch detection unit 340, the exclusivity control unit 350, a mode switching unit 360, a settings information acquisition unit 370, a save destination control unit 380, and a settings information deletion unit 390. The display control unit 331 includes the profile display unit 332 and the list display unit 334.

When the "currently selected user" mode is active and the scanner device 2 is activated, the selection unit 320 of the first modification selects, as information to display, the settings information or the identification information of the user terminal that connected last to the scanner device 2 from the user terminals 4 found by the terminal search unit 300 on the basis of the connection history stored in the connection history DB 372. When the "all users" mode is active, the selection unit 320 of the first modification selects, as information to display, the settings information or the identification information of all the user terminals stored in the setting DB 370. When the "currently connected user" mode is active, the selection unit 320 of the first modification selects, as information to display, the settings information acquired by the settings information acquisition unit 370.

When the "currently connected user" mode is active, the display control unit 331 displays, on the touch panel 208, only the settings information (profile) acquired by the settings information acquisition unit 370 from the user terminal 4 currently connected to the scanner device 2.

The mode switching unit 360 switches between a first operation mode in which the settings information (profile) of the user is recorded only in the volatile memory and a second operation mode in which the settings information (profile) of the user is recorded in the non-volatile memory. In the present modification, the first operation mode corresponds to the "currently connected user" mode, and the second operation mode corresponds to the "currently selected user" mode and the "all users" mode. In the present modification, settings of the operation modes can be performed at any time through a mode selection screen 93 illustrated in FIG. 18A.

When the "currently connected user" mode is active, the settings information acquisition unit 370 acquires the settings information (specifically, the profile) relating to the scanner device 2 from the user terminal 4 exclusively using the scanner device 2. More specifically, when the "currently connected user" mode is active, the settings information acquisition unit 370 acquires the profile of the scanner device 2 from the user terminal 4 each time the user terminal 4 connects to the scanner device 2.

The save destination control unit 380 switches the save location of the settings information (profile) acquired from the user terminal 4 according to the operation mode. More specifically, when the "currently connected user" mode is active, the save destination control unit 380 saves the settings information (profile) acquired from the user terminal 4 into the volatile memory (the memory 202), and when the "currently selected user" mode or the "all users" mode is active, the save destination control unit 380 saves the settings information (profile) acquired from the user terminal 4 into the non-volatile memory 204.

When the "currently connected user" mode is active and the state in which the scanner device 2 is exclusively used is cancelled by the exclusivity control unit 350, the settings information deletion unit 390 deletes the settings information (profile) acquired by the settings information acquisition unit 370 from the save location. In other words, in a case where the "currently connected user" mode is active, the settings information deletion unit 390 deletes the settings information of the previous user from the memory 202 when the exclusivity control unit 350 switches to a state in which another user exclusively uses the scanner device 2.

Figure 16:
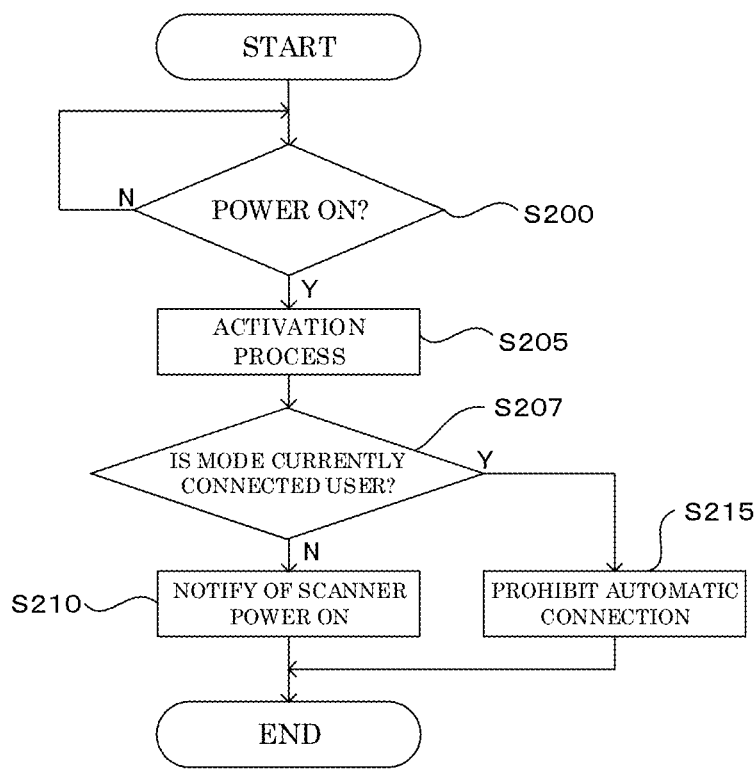
FIG. 16 is a flowchart for describing scanner-side activation processing (S22) of the scanner device 2 in the first modification.

FIG. 16 is a flowchart for describing scanner-side activation processing (S22) of the scanner device 2 in the first modification. Note that steps in the diagram that are essentially the same as those in FIG. 8 are given the same reference sign.

As illustrated in FIG. 16, in step 200 (S200), if the scanner device 2 does not detect a power ON operation, the scanner device 2 goes into standby until a power ON operation is performed (No in step 200), and if a power ON operation is detected, the process proceeds to processing of step 205 (Yes in step 200).

In step 205 (S205), the scanner device 2 executes activation processing.

In step 207 (S207), the scanner device 2 determines the operation mode, and if the operation mode is the "currently connected user" mode, the process proceeds to processing of step 215. If the operation mode is the "currently selected user" mode or the "all users" mode, the process proceeds to processing of step 210.

In step 210 (S210), the terminal search unit 300 of the scanner device 2 broadcasts a power ON notification to the network 7 and transmits back scanner device information including information for automatic connection to the user terminals 4 that reply the notification.

In step 215 (S215), the terminal search unit 300 broadcasts a power ON notification to the network 7 and transmits back scanner device information not including information for automatic connection to the user terminals 4 that reply the notification.

Thus, in the first modification, when the "currently connected user" mode is active, automatic connection from the user terminals 4 is prohibited, and only manual connection to the scanner device 2 via a user connection operation is allowed.

FIG. 17 is a flowchart for describing connection processing (S45) when the "currently connected user" mode is active.

As illustrated in FIG. 17, in step 450 (S450), the connection request unit 310 of the scanner device 2 goes into standby until a scanner search notification is received from the user terminal 4 (No in step 450), and when a scanner search notification is received from the user terminal 4, the process proceeds to processing of step 455 (Yes in step 450).

In step 455 (S455), the connection request unit 310 transmits, to the user terminal 4, scanner device information (including dummy identification information that does not match any of the user terminals) as a reply to the scanner search notification. In other words, the connection request unit 310 transmits scanner device information that prohibits automatic connection for the user terminals 4.

In step 460 (S460), if the scanner program 3 receives an exclusivity command from any one of the user terminals 4, the process proceeds to the processing of step 465, and if the scanner program 3 does not receive an exclusivity command from any of the user terminals 4 within a predetermined time period, the connection processing (S45) ends.

In step 465 (S465), when the exclusivity control unit 350 receives an exclusivity command from any one of the user terminals 4, a state transitions to a state in which the user terminal 4 exclusively uses the scanner device 2.

In step 470 (S470), the settings information acquisition unit 370 receives a profile from the exclusive user terminal 4.

In step 475 (S475), the save destination control unit 380 saves the profile received by the settings information acquisition unit 370 only into the memory 202.

In step 480 (S480), the display control unit 331 displays only the profile saved in the memory 202 on the touch panel 208.

In step 485 (S485), the exclusivity control unit 352 maintains the state in which the user terminal 4 currently connected exclusively uses the scanner device 200 until a connection request from another terminal is detected (No in step 485), and when a user switch operation is detected, the process proceeds to processing of step 490 (Yes in step 485).

In step 490 (S490), the exclusivity control unit 352 cancels the exclusivity state of the user terminal 4 currently connected in response to the user switch operation, and the settings information deletion unit 390 deletes the profile (profile of this user terminal 4) saved in the memory 202.

Thus, each time the scanner device 2 of the first modification connects to the user terminal 4 in response to a connection request from the user terminal 4, the profile from the user terminal 4 is received, the received profile is saved only into the volatile memory (the memory 202), and the saved profile is removed when the exclusivity state of the user terminal 4 is cancelled.

FIGS. 18A to 18D are diagrams illustrating an example of a display screen according to the first modification.

Figure 18A:
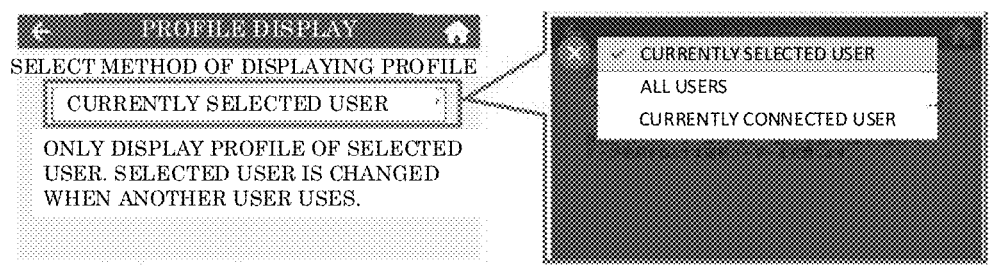
FIGS. 18A to 18D are diagrams illustrating an example of a display screen according to the first modification.
Figure 18B:
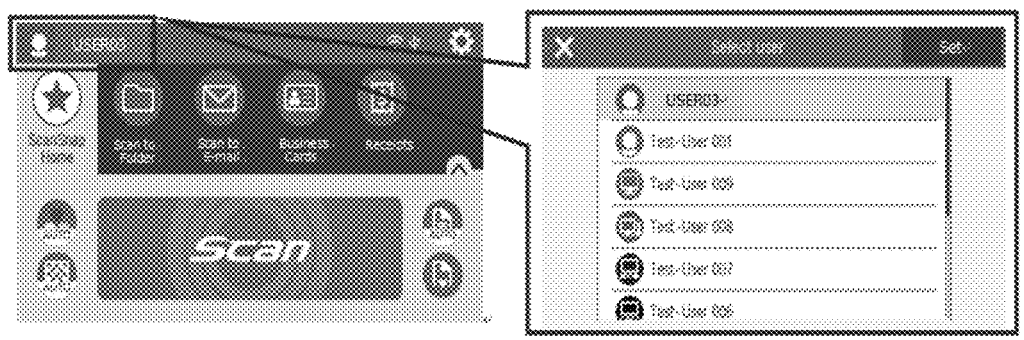

On the mode selection screen 93 of FIG. 18A, when the "currently selected user" mode is selected, the display control unit 331 displays a display screen 94 illustrated in FIG. 18B on the touch panel 208. The name of the user terminal currently connected is displayed on the display screen 94 of the "currently selected user" mode. On the displayed profile, only the items defined by the user terminal 4 are displayed. On the display screen 94, when a user icon is selected, a list of selection candidates is displayed in order of previously connected user terminals, and the user terminal currently connected may be switched and a different user terminal may be selected.

Figure 18C:

Also, on the mode selection screen 93 of FIG. 18A, when the "all users" mode is selected, the display control unit 331 displays a display screen 95 illustrated in FIG. 18C on the touch panel 208. The profiles of all of the user terminals registered in the scanner device 2 are displayed on the display screen 95 of the "all users" mode. Because any of the profiles can be selected, it is difficult to find one's own profile and there is a high likelihood of a mistaken transmission.

Figure 18D:

On the other hand, on the mode selection screen 93 of FIG. 18A, when the "currently connected user" mode is selected, the display control unit 331 displays a display screen 96 illustrated in FIG. 18D on the touch panel 208. Only the profile defined by the user terminal being connected to the scanner device 2 is displayed on the display screen 96 of the "currently connected user" mode, and user icons are not displayed. Because only the profile defined by the user terminal is displayed and there is no way to switch to another user via the touch panel 208, there is no chance of a mistaken transmission. When the user terminal 4 is disconnected or the power of the scanner device 2 is turned OFF, the connection information is deleted from the scanner device 2. This ensures a high level of security.

Figure 19:
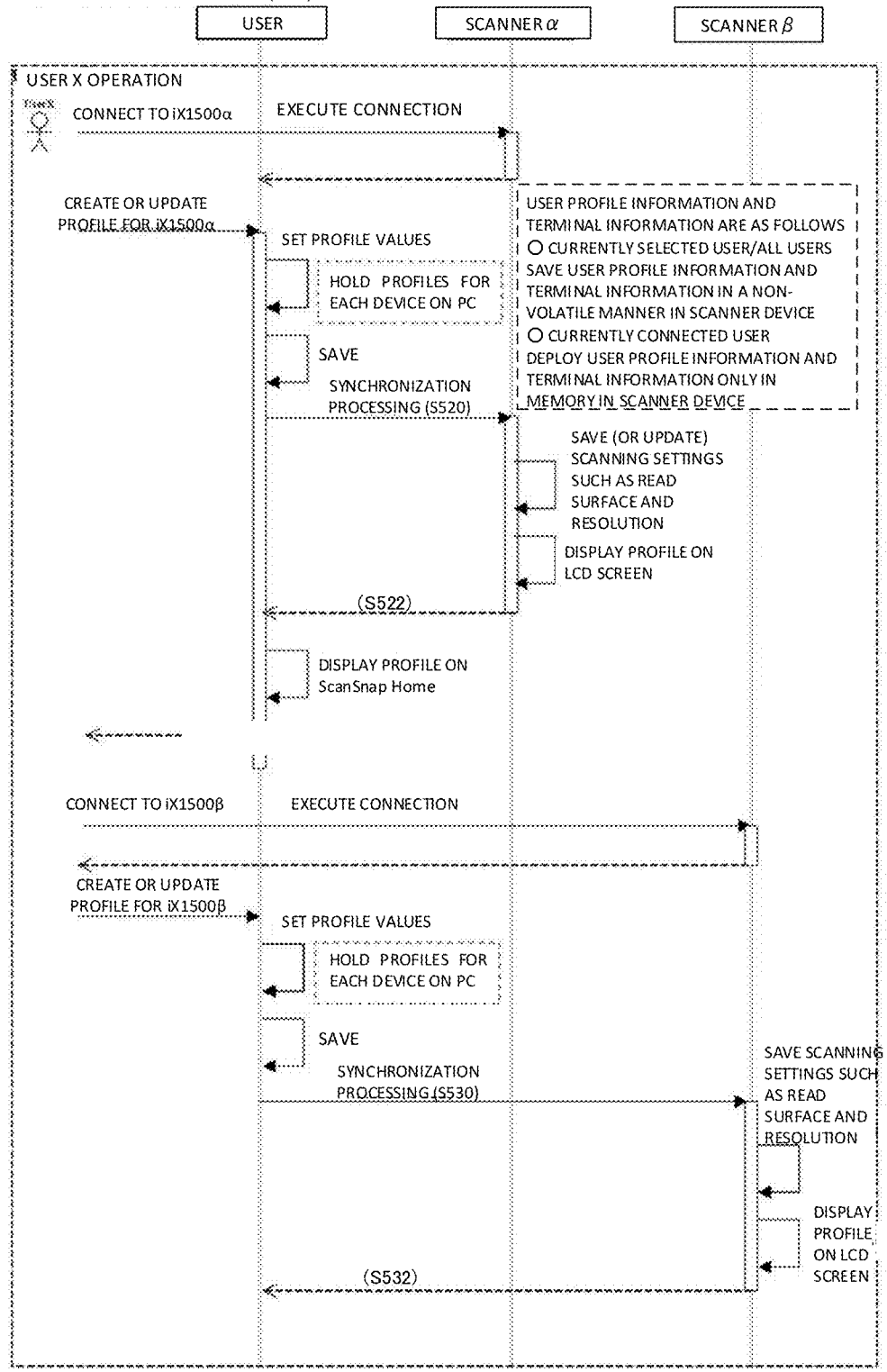
FIG. 19 is a sequence diagram (S52) when a profile is created when the "currently connected user" mode is set.

FIG. 19 is a sequence diagram (S52) when a profile is created when the "currently connected user" mode is set.

As illustrated in FIG. 19, when the user activates the driver program 5 at the user terminal 4, sets values for the profile for a scanner device α, and saves the values into the setting DB 570 in associated with the scanner device α, the user terminal 4 transmits, to the scanner device α, the profile saved in the setting DB 570 and synchronizes the setting DB (S520).

When the scanner device α saves the received profile only into the memory 202, and displays the profile on the touch panel 208, the scanner device a notifies the user terminal 4 of the completion of profile registration (S522). When the connection between the user terminal 4 and the scanner device α is interrupted, the profile on the memory 202 is removed.

Also, when the user terminal 4 connects to another scanner device β, sets the profile for the scanner device β, and synchronizes the setting DB (S530), the scanner device β saves the received profile only into the memory 202, and when the profile is displayed on the touch panel 208, the scanner device β notifies the user terminal 4 of the completion of profile registration (S532).

Figure 20:
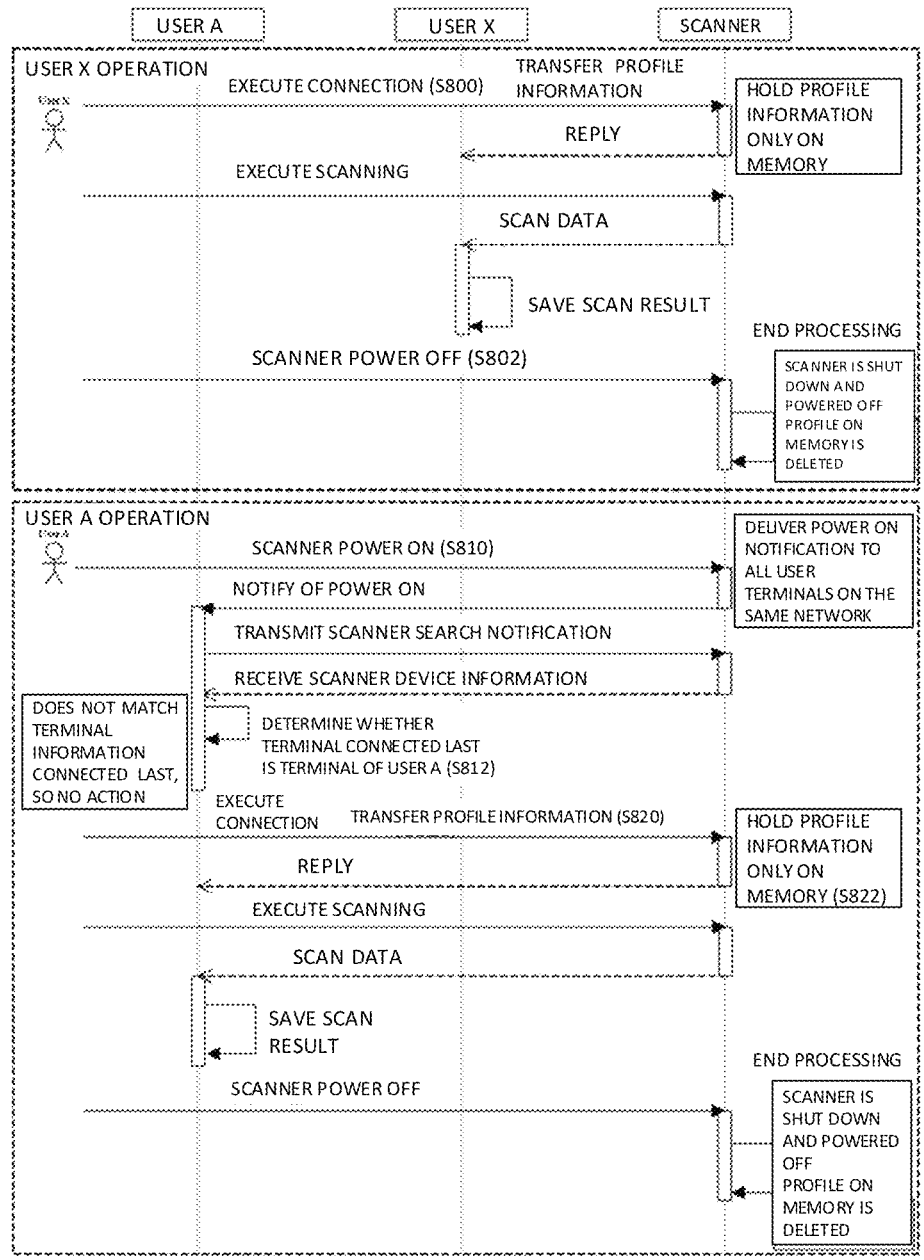
FIG. 20 is a sequence diagram (S80) when a user terminal is switched when the "currently connected user" mode is set.

FIG. 20 is a sequence diagram (S80) when a user terminal is switched when the "currently connected user" mode is set.

As illustrated in FIG. 20, in a time period in which the user terminal 4 of the user X exclusively uses the scanner device 2, when the scanner device 2 detects a touch operation on the start scan button (S800), the scanner device 2 executes scanning processing and transmits the scan data to the user terminal 4 of the user X.

When the user X operates the scanner device 2 to turn OFF the power (S802), the scanner device 2 disconnects the connection with the user terminal 4 and shuts down. The profile stored on the memory 202 is removed.

Next, when the user A operates the scanner device 2 to turn ON the power (S810), the scanner device 2 executes activation processing, and when the activation processing is complete, the scanner device 2 transmits a power ON notification to all of the user terminals 4 on the network 7. In response to the power ON notification, each of the user terminals 4 transmits a scanner search notification to the scanner device 2 and receives the scanner device information from the scanner device 2. The scanner device 2 enters, into the scanner device information, "dummy identification information" that does not match any user terminals.

Each of the user terminals 4 compares the identification information in the scanner device information received from the scanner device 2 and the identification information of the own user terminal, and because none of them match, nothing is performed (S812).

Next, when the user A connects to the scanner device 2 and transmits the profile to the scanner device 2 (S820), the scanner device 2 is in a state in which the user A exclusively uses the scanner device 2 and stores the profile of the user A into the memory 202, so that a scanning operation using the profile of the user A is allowed (S822).

Thus, the scanner device 2 of the first modification provides three operation modes with different security levels, allowing the scanner device 2 to be used according to a use environment and wishes of users.

In the descriptions in the above embodiment and modification, a specific example is employed in which the scanner device 2 is shared over the network. However, no such limitation is intended, and the technology is applicable to a display, a projector, and a speaker, for example. If the technology is applied to a display, an effect is expected in the following scenes.

Considering a scene in which a plurality of user terminals connect to a shared display as in a display installed in a meeting room. In a case where different users one after the after use the display, by switching user terminals on the display, a user terminal simply can connect to the display for displaying on the display.

Also, in a case where a user wishes to use the display for a while, by simply activating the display, the user can swiftly exclusively connect to the display through the user terminal of the user for displaying on the display.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A peripheral device shared by a plurality of user terminals, the peripheral device comprising:
    a volatile memory;
    a display device;
    a non-volatile memory; and
    a processor coupled to the volatile memory and the non-volatile memory, the processor configured to:
        store, into the non-volatile memory, a connection history of a user terminal to the peripheral device;
        when a first mode or a second mode is active, store, into the non-volatile memory, settings information specifying an operation of the peripheral device in association with identification information of the user terminal, the first mode being an operation mode in which only the settings information of a selected specific user is displayed, and the second mode being an operation mode in which all settings information registered in the peripheral device are displayed;
        when a third mode is active, store, into the volatile memory, the settings information in association with the identification information of the user terminal, the third mode being an operation mode in which only the settings information of a user connected to the peripheral device is displayed;
        select the identification information of the user terminal stored in the non-volatile memory, based on the connection history stored in the non-volatile memory;
        display, on the display device, the selected identification information of the user terminal or the settings information associated with the selected identification information of the user terminal without displaying information relating to another user terminal; and when the third mode is active and a state in which the peripheral device is exclusively used is cancelled, delete the settings information from the volatile memory.

2. The peripheral device according to claim 1, wherein the processor is configured to:
when the peripheral device is activated, select settings information or identification information of a user terminal that connected last to the peripheral device, based on the connection history stored in the non-volatile memory; and
when the peripheral device is activated, display the settings information or the identification information of the user terminal that connected last on the display device.

3. The peripheral device according to claim 2, wherein the processor is further configured to:
determine whether or not to connect to a user terminal; and
select the settings information or the identification information of a user terminal, based on the connection history stored in the non-volatile memory and a result of the determination.

4. The peripheral device according to claim 3, wherein the processor is further configured to:
detect a switch operation of a user terminal using the peripheral device; and
in a case where a switch operation is detected, display identification information of the plurality of user terminals as selections on the display device and display the settings information of a selected user terminal on the display device.

5. The peripheral device according to claim 4, wherein the processor is configured to:
in a case where a switch operation is detected, display the identification information of a user terminal stored in the non-volatile memory as a switch selection.

6. The peripheral device according to claim 5, wherein the processor is configured to:
display a switch selection arranged in order of the connection history.

7. A display control method for a peripheral device shared by a plurality of user terminals, the display control method comprising the steps of:
storing, into a non-volatile memory, a connection history of a user terminal for connecting the peripheral device;
when a first mode or a second mode is active, storing, into the non-volatile memory, settings information specifying an operation of the peripheral device in association with identification information of the user terminal, the first mode being an operation mode in which only the settings information of a selected specific user is displayed, and the second mode being an operation mode in which all settings information registered in the peripheral device are displayed;
when a third mode is active, storing, into a volatile memory, the settings information in association with the identification information of the user terminal, the third mode being an operation mode in which only the settings information of a user connected to the peripheral device is displayed;
selecting, based on the stored connection history stored in the non-volatile memory, the identification information of the user terminal stored in the non-volatile memory;
displaying, on a display device, the selected identification information of the user terminal or the settings information associated with the selected identification information of the user terminal without displaying information relating to another user terminal; and
deleting the settings information form the volatile memory when the third mode is active and a state in which the peripheral device is exclusively used is cancelled.

* * * * *